United States Patent [19]

Upton

[11] 4,214,629
[45] Jul. 29, 1980

[54] WELL PACKER BYPASS VALVE SEAL ASSEMBLY

[75] Inventor: Thomas E. Upton, Garland, Tex.

[73] Assignee: Dresser Industries, Inc., Dallas, Tex.

[21] Appl. No.: 31,566

[22] Filed: Apr. 19, 1979

Related U.S. Application Data

[63] Continuation-in-part of Ser. No. 895,423, Apr. 12, 1978, Pat. No. 4,188,998.

[51] Int. Cl.² .................... E21B 33/12; B65D 53/02
[52] U.S. Cl. .................................. 166/129; 166/183; 277/123
[58] Field of Search ............... 166/128, 129, 131, 152, 166/183, 184, 334; 277/167.3, 178, 187, 188 R, 188 A, 207 A, 207 R, 123–125; 137/625.25

[56] References Cited

U.S. PATENT DOCUMENTS

| | | | |
|---|---|---|---|
| 1,776,911 | 9/1930 | Jones | 277/123 |
| 1,780,764 | 11/1930 | Noble | 277/123 |
| 3,148,732 | 9/1964 | Gage | 166/334 |
| 3,163,225 | 12/1964 | Perkins | 166/128 |
| 3,287,022 | 11/1966 | Soechting | 277/188 R |
| 3,419,280 | 12/1968 | Wheeler | 277/124 |
| 3,731,740 | 5/1973 | Douglas | 166/120 |
| 3,735,814 | 5/1973 | Tucker | 166/217 |

*Primary Examiner*—James A. Leppink
*Attorney, Agent, or Firm*—Richard M. Byron

[57] ABSTRACT

A seal assembly for a bypass valve in a well tool such as a packer has a tubular seal carrier with a pair of annular seal elements mounted in a longitudinally spaced relation about the outer periphery thereof. The annular seal elements are anchored in separate grooves around the exterior of the seal carrier such that they are prevented from being dislodged by fluid pressure. Another seal can be provided around the interior of the seal carrier to seal between this seal carrier and a well tool or packer mandrel.

8 Claims, 4 Drawing Figures

WELL PACKER BYPASS VALVE SEAL ASSEMBLY

CROSS REFERENCE TO RELATED APPLICATION

This is a continuation-in-part application for patent based on patent application U.S. Ser. No. 895,423, filed Apr. 12, 1978 now U.S. Pat. No. 4,188,998.

BACKGROUND OF THE INVENTION

The invention is related to a seal assembly for an internal valve of a downhole oil well tool such as an oil well packer.

Normally, a well packer is used in oil or gas operations to seal one zone above the packer from another zone below the packer within the casing of a well bore. Packers are used for numerous operations such as zone flow testing, cementing, acidizing, and other fracturing operations.

One of the primary requirements of a satisfactory well packer is that it may be placed at a desired location and selectively set into a gripping and sealing engagement across the well casing so it can support fluid pressure from above or below an effectively isolate two zones within the casing string. When a packer is sealed in a casing, one seal is formed between an exterior portion of the packing and an interior portion of the casing and additionally another seal is formed within the packer between a mandrel and an internal valve within the packer. Obviously, the failure of either of the seals can result in fluid leakage between the separated zones within the casing which is basically undesirable. The achievement of a dependable and reliable seal within the packers internal valve has presented a difficulty in the development of well packers.

A typical packer internal valve seal assembly has a seal ring of elastomeric material that is bonded to and molded in place inside a groove in a metal seal carrier. Also, typical seal rings may have a groove formed around a mid-portion of the face seal to divide the seal into two segments In the normal operation of a packer, fluid flows through a port immediately above the seal assembly, through the valve chamber, past the face of the seal and into the packer body cavity below while the packer is being run into or withdrawn from the well casing. In the setting operation of the packer, the packer body is displaced upward over the mandrel and the valve member on the mandrel engages the face portion of the seal ring. When this occurs, a relatively higher fluid flow rate is experienced by this seal element as the valve member moves toward the seal ring. The high fluid flow rate at this time tends to erode or deteriorate the seal capability of this valve seal rather rapidly. In extreme cases where the fluids contain particulate material and travel at relatively high flow rates, the valve seal can be eroded to the point of leaking after opening and closing the valve only two or three times. Another inherent difficulty with a bonded seal such as described above is retaining the elastomeric seal in the metal carrier ring. This problem is particularly acute for a seal shown in this patent because the dimension of the seal across the bottom of the groove is significantly larger than the depth dimension of the seal within the groove. Therefore, the broad portion of this seal can easily be pulled from the groove when high flow rates are encountered and if there is a failure in the bond or a failure in the seal material, this will allow a portion or possibly all of the seal to be dislodged from the carrier ring. The overall results of failure of a packer internal valve is that leakage can occur between the zones which are desired to be isolated within the well casing, thereby hindering the operation being performed on a particular well. Also, when these seals are damaged, the packer must be disassembled and the valve seal carrier replaced with another unit which is time consuming, troublesome and expensive for oil well field operations.

SUMMARY OF THE INVENTION

A packer valve seal assembly is provided which has a tubular seal carrier that is mountable within the valve housing of a well packer on the packer mandrel. The seal carrier assembly is constructed with a pair of annular seal elements mounted in a longitudinally spaced relation around the outer periphery of the seal carrier. The seal elements are mounted in separate grooves which have a generally cross-sectionally dovetail or an internally flared configuration which anchors the seal elements in the grooves to prevent undue flexing of the seal elements and provides excellent resistance to seal degradation. The seal carrier assembly can have a seal mounted around the inner perimeter thereof to seal between the seal carrier assembly and the associated packer mandrel.

One object of this invention is to provide a well tool or well packer valve seal assembly which overcomes the aforementioned disadvantages of the prior art devices.

Still, one other object of this invention is to provide a well packer valve seal assembly having a pair of seal elements mounted in a tubular seal carrier which are anchored sufficiently to prevent the seals from being deteriorated by high flow rates as the packer valve or other well tool valve is opened and closed.

Still, one other object of this invention is to provide a packer seal assembly which has dual seals either of which is capable of sealing the packer or well tool valve and which can be easily replaced in the field by the simple removal of a retainer ring and replacement of the seal element.

Various other objects, advantages, and features of this invention will become apparent to those skilled in the art from the following discussion, taken in conjunction with the accompanying drawings, in which:

Figure 1:
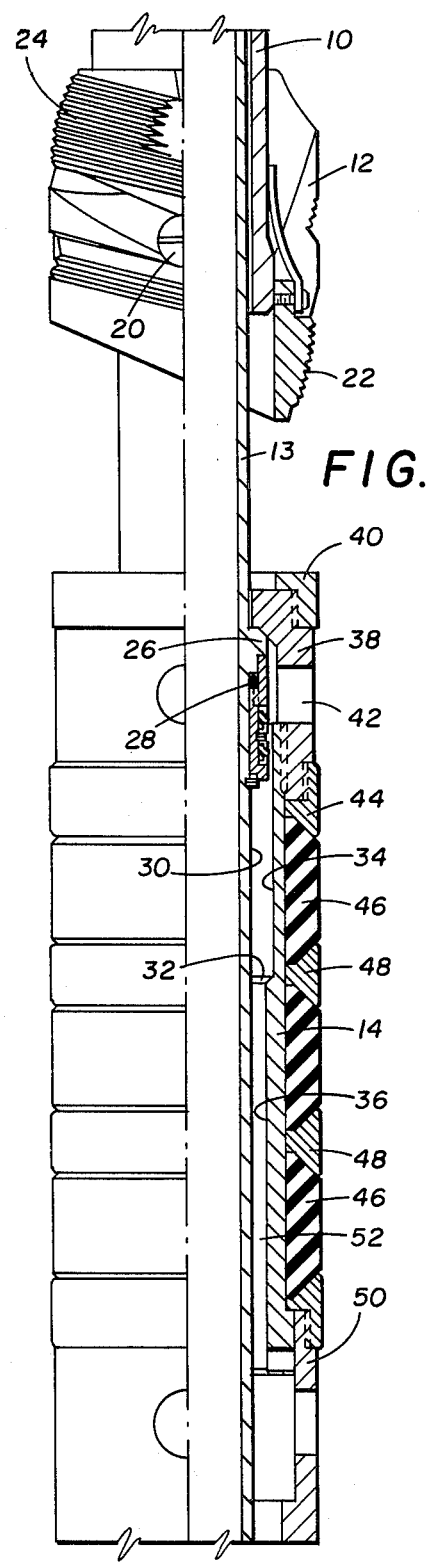
FIG. 1 is a partially cutaway elevation view of a central portion of a well packer which incorporates one embodiment, (1), of the valve seal assembly of this invention.

The following is a discussion and description of the preferred specific embodiments of the well packer valve seal assembly of this invention, such being made with reference to the drawings, whereupon the same reference numerals are used to indicate the same or similar parts and/or structure. It is to be understood that such discussion and description is not to unduly or limit the scope of the invention.

DETAILED DESCRIPTION OF THE INVENTION

FIG. 1 shows a portion of a well packer which has the bypass valve thereof fitted with the valve seal assembly of this invention. The portion of the packer shown, includes a slip carrier 10 with a slip 12 mounted thereon, a mandrel 13 extending through the length of the packer, a packer body 14 and one embodiment, (1), of the novel valve seal assembly of this invention is indicated generally at 16. Slip 12 is pivotally mounted on slip carrier 10 by pivot pins 20 extending from opposite sides of the slip carrier 10 and mounted through openings in opposite sides of the slip. Slip 12 is provided with two gripping surfaces 22 and 24 on opposite sides thereof to engage the interior of the well casing.

The mandrel 13 runs the length of the packer interior and includes an outwardly extending valve seal supporting shoulder 26 with a stepped lower side to engage the seal carrier and in cooperation therewith retain a seal ring 28. Shoulder 26 extends radially outward from the mandrel's smooth cylindrical outer surface 30.

Figure 2:
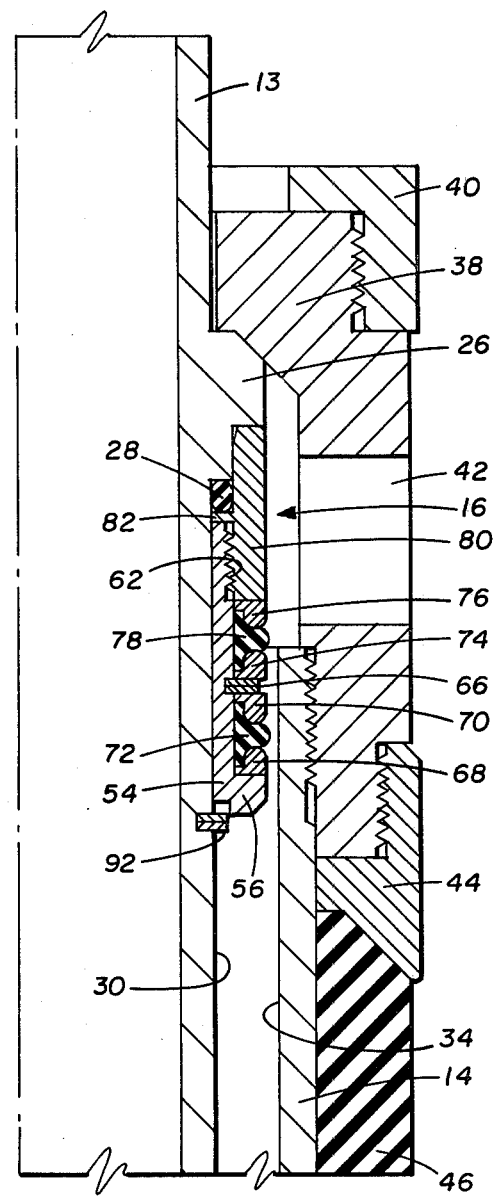
FIG. 2 is an enlarged partially cutaway elevation view of the valve seal assembly and associated portions of the packer shown in FIG. 1 with the valve in the open position.
Figure 3:
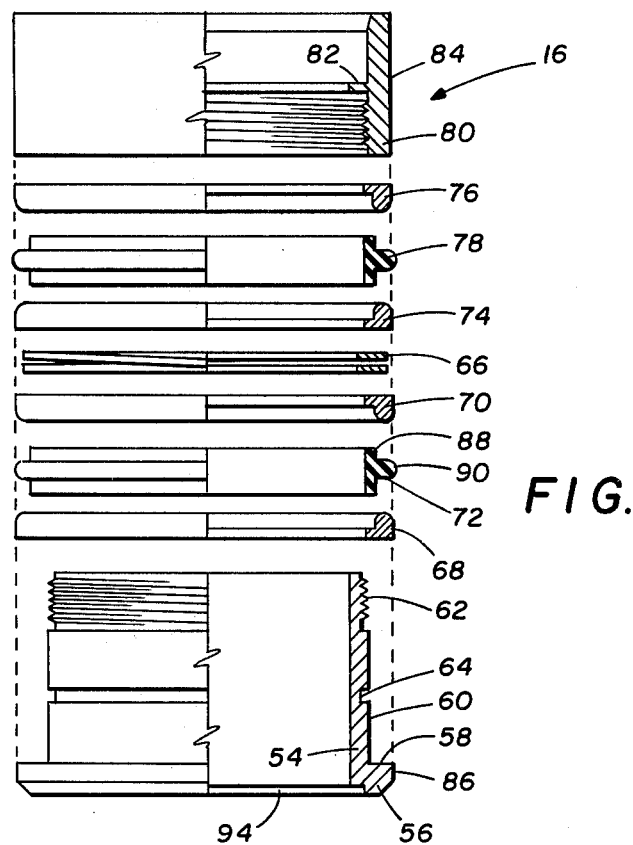
FIG. 3 is an enlarged partially cutaway elevation view of one embodiment of the seal carrier assembly with the seal back-up rings, seal rings, the divider ring and the seal retainer ring displaced in an exploded relation.

Referring to FIGS. 2 and 3, the valve seal assembly includes a tubular seal carrier 54 with associated seal back-up rings, seal rings and a retainer arranged to form groove-like recesses around the exterior or peripheral portion of the seal assembly to mount and retain a pair of annular seal elements. Seal carrier 54 is a tubular member with one end portion having a radially outwardly extending ridge 56 around the periphery thereof forming an abutment 58 that faces the opposite end portion of the seal carrier. A major longitudinal portion 40 of the seal carrier outer periphery is a non-threaded generally smooth cylindrical surface 60 extending from abutment 58 to a smaller diameter threaded portion 62 at the opposite end of the seal carrier. A groove 64 is formed around the longitudinal mid-section of non-threaded portions 60 to receive and mount a divider ring 66 that functions to separate the seal ring support structures. Divider ring 66 can be a spiral or helical ring constructed to pass around the circumference of tubular seal carrier 54 at least once with the radially inner portion thereof residing within divider groove 64 and the radially outer portion extending sufficiently beyond the cylindrical surface of non-threaded portion 60 to retain the seal back-up rings and annular seal elements and associated back-up rings in place.

In the lower portion of the seal assembly as shown in FIG. 3, back-up rings 68 and 70 are positioned on opposite sides of annular seal element or seal ring 72 and these are positioned below divider 66 when the seal assembly is put together as shown in FIG. 2. In the upper portion of the seal assembly, an additional pair of seal back-up rings 74 and 76 are positioned on opposite sides of another annular seal element or seal ring 78 and these are positioned above divider 66 in the completed valve member seal assembly. A retainer ring 80 is threadedly mounted on seal carrier threaded portion 62 and it abuts the uppermost seal back-up ring 76. Retainer ring 80 is a tubular member which is threaded on the interior of one end portion to mount with tubular seal carrier threaded portion 62. Retainer ring 80 has an inwardly extending interior ridge 82 projecting radially inwardly into a mid-portion thereof for contacting the end of tubular seal carrier 54 and retaining seal ring 28 in place against mandrel 13 as shown in FIG. 2. The exterior surface 84 of retainer ring 80 is selected to be of the same radial dimension as the exterior surface 86 of tubular seal carrier ridge 56. Also, the outer peripheral dimension of back-up rings 68, 70, 74 and 76 is selected to be approximately no larger than the outer peripheral dimension of retainer outer surface 84 and ridge outer surface 86 so the assembly will pass within the smaller diameter interior surface 36 of packer body 14.

The seal back-up rings are all generally similar in construction and are used in pairs with their associated annular seal element. These seal back-up rings are generally L-shaped with one leg radially disposed relative to the longitudinal axis of the seal carrier and the other leg disposed to lie along side a radial surface of the seal carrier. The portion of the leg which is suppose to lie along the radial surface of the seal carrier is significantly thicker than the portion of the back-up ring which is disposed transverse to the longitudinal axis of the seal carrier. This thicker portion of the back-up ring is positioned radially outward of and covering the portion of the associated seal ring.

Seal rings 72 and 78 have the same cross-sectional shape. The shape of these seal rings is generally T-shaped with a relatively thin portion 88 being longitudinally disposed relative to tubular seal carrier 54 and a thicker transverse or radially disposed portion 90 radially disposed relative to tubular seal carrier 54. The thinner longitudinally disposed portion of the seal ring is sized to fit between tubular seal carrier non-threaded surface portion 60 and the underside of the associated thicker portion of the seal back-up rings which lie in a longitudinal relation to the tubular seal carrier and spaced from surface 60. Radially disposed sealing element portions 90 are sufficiently long to extend slightly beyond the outer perimeter of the seal back-up rings when the seal assembly is completed and positioned as shown in FIG. 2. The protrusion of this portion of the seal elements is arranged so they will establish a fluid tight seal with packer body 14 when the seal elements pass within smaller diameter surface 36 in the lower portion of packer body 14. When valve member seal assembly 16 is positioned within this lower portion of packer body 14, either one of the annular seal elements will be compressed sufficiently to establish a fluid tight seal between packer body 14 and mandrel 13.

Referring to FIG. 2 with bypass valve member seal assembly 16 mounted on mandrel 13 as shown, a seal ring 28 is positioned around mandrel, adjacent to ridge 82 and within the interior of retainer ring 80 where it provides a fluid tight seal between the retainer ring and the mandrel. A groove is provided in mandrel 13 immediately below bypass valve member seal assembly 16 for the mounting of a retainer ring 92. Retainer ring 92 is used to allow only a limited downward motion of the seal assembly on the mandrel when the mandrel is raised relative in the packer body. Retainer ring 92 is selected of a radial dimension which will allow it to pass within a recess 94 around the interior of the ridge end portion of tubular seal carrier 54.

In the use of this embodiment, (1), of the bypass valve member seal assembly of this invention, it is normally mounted with a packer mandrel as shown in FIGS. 1 and 2. This embodiment of the bypass valve member seal assembly 16 is constructed so that it can be easily removed from the packer mandrel and disassembled in the field without the use of special tools or fixtures then reassembled for continued use of the packer. In normal use of the packer having this valve member seal assembly, it can be expected that after a significant use of the valve, the seal rings will have to be replaced because they are of the naturally wearing portion of the valve. It is to be noted that because of the T-shaped construction of the seal rings and the compression due to the overhanding lip of the seal back-up rings, these seal rings are retained in place in the seal assembly even when the seal assembly is exposed to damaging forces. These potentially damaging forces include opening or closing the valve when it is exposed to an extremely large differential pressure and exposing the valve to a substantially high fluid flow rate. Even if one of the seal rings is no longer able to maintain a fluid tight seal with packer body inner surface 36, the other seal ring will provide a fluid tight seal and thereby sustain the seal integrity of the valve.

Figure 4:
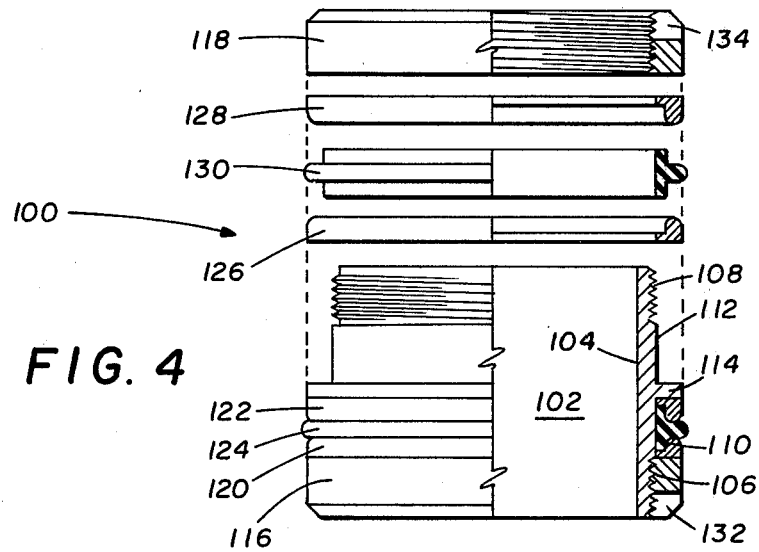
FIG. 4 is an enlarged partially cutaway elevation view of another embodiment, (2), of the seal carrier assembly with the seal back-up rings, seal ring and seal retainer ring on one end thereof displaced in an exploded relation.

FIG. 4 shows another embodiment, (2), of the bypass valve member seal assembly of this invention with such indicated generally at 100. This embodiment of the bypass valve member seal assembly includes a seal carrier 102 which has a pair of annular seal elements mounted in groove-like recesses around the exterior thereof. These seal elements are longitudinally spaced in a manner generally similar to that described above in conjunction with the other embodiment of this invention. This embodiment, (2), differs from the previous embodiment, (1), in that the seal carrier is provided with threadedly mounted retainer rings on both ends thereof to enable the seal rings to be removed from either end of the seal carrier.

In regard to seal carrier 102, it is a generally cylindrical member with an uniformed diameter interior surface 104 and a stepped exterior surface. Each end portion of seal carrier 102 has a threaded portion, 106 and 108 respectively, which extends inwardly short distance from the outer end of each end of the seal carrier. Adjacent to each of the threaded portions, 106 and 108 respectively, is a slightly larger diameter non-threaded portion 110 and 112 respectively, which extend to the center portion of the seal carrier 102 where they terminate at a radially outwardly extending ridge 114 integrally formed in the seal carrier. Ridge 114 forms an abutment for each of the separate seal back-up rings as shown. Each of the threaded end portions, 106 and 108, of seal carrier 102 are provided with threadedly mounted retainer rings, 116 and 118 respectively, for securing the seal back-up rings and seal rings on the respective end portions of the seal assembly. In the lower portion of FIG. 4, a pair of seal back-up rings 120 and 122 are provided on opposite sides of an annular seal element or seal ring 124. On the upper portion of FIG. 4, another pair of seal back-up rings 126 and 128 are provided on opposite sides of their associated seal element or seal ring 130. The seal back-up rings and seal rings shown in FIG. 4 have the same structural features as the seal back-up rings and seal rings described above in conjunction with the first embodiment, (1), therefore, a complete description of the structural details of these rings will not be presented again.

In assembly of the components of bypass valve member seal assembly 100, the seal back-up rings and their associated seal elements are placed on the outer periphery of the seal carrier and the relationship shown in the lower portion of FIG. 4. Retainer rings 116 and 118 are then threadedly mounted with threaded portions 106 and 108. A pair of notches are provided on opposite sides of the outer end of each retainer ring so that a suitable lug wrench can be used to tighten the retainer ring. In the cutaway portion of FIG. 4, retainer ring 116 has the visible notch indicated at 132 and retainer ring 118 has the visible notch indicated at 134.

It is to be noted that if desired, retainer rings 116 and 118 can be constructed without the notches and a circumferentially compressive wrench or similar hand tool used to install and remove the retainer rings. When this seal assembly is completed and ready for use, the outer periphery of seal rings 124 and 130 extends slightly radially outward of the outer peripheral surface of the associated seal back-up rings, the retainer rings and ridge 114 so that it can make sealing contact with portions of the valve structure in which it is installed.

Bypass valve member seal assembly 100 is constructed so that it can be mounted with the packer mandrel having a construction generally similar to that shown in FIGS. 1 and 2 only with sealing between the seal carrier and the mandrel accomplished by means other than the sealing means shown in FIGS. 1 and 2. Also, seal assembly 100 can be mounted with well tools other than a packer for which may incorporate in their construction a seal carrier support structure which will mount the seal assembly in operable relation to an annular valve seat assembly which in operation of the tool will engage sealing elements of this valve member seal assembly. In the use of both of the embodiments of the novel valve member seal assembly of this invention, it has been found that the seal elements can be easily replaced under field conditions in the event they are deteriorated sufficiently to begin to leak. Also, in the use of this seal assembly in packers, it has been found that using the pair of closely spaced seal elements retained in the above described structure virtually eliminates the problem of having the seal elements blown out or severely damaged due to normal operation of the packer. Additionally, it has been found that in the event one of the seal elements is deteriorated sufficiently to begin leaking, the remaining seal element is sufficient to prevent fluid leakage through the packer valve for normal operating pressures where the high pressure is either above or below the packer.

The embodiments of the invention in which an exclusive property or privilege is claimed are defined as follows:

1. In a well packer having a mandrel mountable with a tubular support for the packer; a slip mounted on a tubular slip carrier around the mandrel; a tubular packer body mounted around and operably connected to said mandrel; a tubular bypass valve housing mounted with the packer body having a bypass valve seat assembly in the interior of said packer body; and a tubular bypass valve member on the outer periphery of said mandrel and having a seal assembly engageable with said bypass valve seat assembly when said well packer is in a set condition; an improved bypass valve member seal assembly comprising:

a tubular seal carrier mounted around a mid-portion of said mandrel;

a pair of independent annular seal elements mounted in a longitudinally spaced relation around the exterior periphery of said seal carrier, said seal elements being anchored in opposite end portions of said seal carrier in separate groove-like annular cavities, each of said groove-like cavities are formed by a radially inner groove-like cavity portion having a greater longitudinal dimension, relative to the longitudinal axis of the tubular seal carrier, than a connecting radially outer groove-like cavity portion which opens radially outward toward the tubular packer body and said seal elements being shaped in conformance with their associated groove-like cavities;

said seal carrier has an annular seal retainer secured thereto and rigidly mounted therewith to retain the respective seal element in the associated groove; and said seal carrier being adapted to have an inner seal element mounted around the inner periphery thereof to seal between said seal carrier and said mandrel.

2. The improved bypass member seal assembly of claim 1, wherein:

said tubular seal carrier has a stepped outer peripheral surface including a small diameter threaded portion at one end portion thereof and a larger diameter non-threaded portion extending from said threaded portion to a radially outwardly extending ridge at the other end portion of said tubular seal carrier;

said non-threaded portion has a groove around a mid-portion thereof and a separation ring removably mounted therein extending from said groove forming a divider between opposite end portions of said outer peripheral surface;

a seal back-up ring is mounted around said non-threaded portion adjacent to said ridge; a seal element adjacent to said seal back-up ring; another seal back-up ring on the other side of said seal element and adjacent to one side of said separation ring; another back-up ring on the other side of said separation ring; another seal element adjacent to the last named seal back-up ring; another seal back-up ring adjacent to the last named seal element; and a seal retainer ring threadedly mounted on the threaded portion of said tubular seal carrier; and said seal back-up rings in cooperation with said non-threaded portions form said groove-like cavities to anchor said seal elements.

3. The improved bypass valve member seal assembly of claim 1, wherein:

said tubular seal carrier has a stepped outer peripheral portion around the exterior of each end portion thereof, each of said stepped portions extends inward from the associated end of said tubular seal carrier to a transversely outwardly extending ridge around a mid-portion of the tubular seal carrier;

said stepped portions each include a small diameter threaded portion extending from the associated end of said tubular seal carrier and a large diameter non-threaded portion extending from said small diameter threaded portion to said ridge;

a seal back-up ring is mounted around each of said large diameter portions adjacent to said ridge; a seal element is located adjacent to each seal back-up ring; another seal back-up ring is mounted around each of said large diameter portions on the opposite sides of said associated seal elements from said other back-up seal rings; and a seal retainer ring threadedly mounted on each of said threaded portions in adjacent relation to the associated seal back-up ring such that facing portions of said back-up rings in conjunction with said seal retainer rings and said non-threaded portions form said groove-like annular cavities to anchor said seal elements in place.

4. A downhole well tool valve member seal assembly comprising:

a tubular seal carrier mountable within a tool body between a valve member support and an annular valve seat;

a stepped outer peripheral surface around said tubular seal carrier including a small diameter threaded portion at one end portion thereof and a larger diameter non-threaded portion extending from said threaded portion to a radially outwardly extending ridge at the opposite end portion of said tubular seal carrier; said non-threaded portion has a groove formed around a mid-portion thereof, and a separation ring removably mounted therein and extending radially outward therefrom said groove thereby forming a divider between opposed end portions of said outer peripheral surface;

a seal back-up ring is mounted on said non-threaded portion adjacent to each side of said divider;

a retainer ring is threadedly mounted on said threaded portion, additional back-up rings are mounted on said non-threaded portion adjacent to said ridge and said seal retainer ring and arranged to cooperatively form a pair of seal pockets, each having an open portion on the outer portion thereof opening to said valve chamber and an enlarged inner peripheral portion adjacent to said non-threaded portion such that an enlarged portion of a seal ring will be anchored in said seal pocket; and a seal ring is mounted in each of said seal pockets and extending through said seal pocket open portion and radially outward beyond the exterior periphery of said seal carrier in order to sealingly engage the interior of a tubular valve seat when said well tool is appropriately positioned to close the valve.

5. The downhole well tool valve seal assembly of claim 4, wherein:

said seal rings are each cross-sectionally generally T-shaped with a portion thereof extending through said seal pocket open portion and another portion transverse thereto and positioned in said seal pocket enlarged outer peripheral portion; and said back-up rings each have a lip extending from around the outer perimeter thereof and toward the associated facing back-up ring and overlying a portion of said seal ring.

6. A downhole well tool valve member seal assembly comprising:

a tubular seal carrier mountable within a tool body between a valve member support and an annular valve seat;

a stepped outer peripheral surface around each end portion of said tubular seal carrier extending toward the seal carriers longitudinal mid-portion from the opposed ends thereof to a transverse and radially outwardly extending lip around a mid-portion of said tubular seal carrier, said stepped surfaces each having a small diameter threaded portion extending from said opposed ends to a mid-portion of the stepped surfaces and a larger diameter non-threaded portion extending from said small diameter threaded portion to said lip;

a seal back-up ring is mounted on each non-threaded portion adjacent to said lip;

a retainer ring is threadedly mounted on each threaded portion, back-up rings are mounted on said non-threaded portion adjacent to said back-up rings and said seal retainer rings and cooperatively form a pair of seal pockets, each having an open portion on the outer portion thereof opening to said valve chamber and an enlarged inner peripheral portion adjacent to said non-threaded portion such that an enlarged portion of a seal ring will be anchored in said seal pocket; and a seal ring is mounted in each of said seal pockets and extending through said seal pocket open portion and radially outward beyond the exterior periphery of said seal carrier in order to sealingly engage the interior of a tubular valve seat when said well tool is appropriately positioned to close the valve.

7. The downhole well tool valve seal assembly of claim 6, wherein:

said seal rings are each cross-sectionally generally T-shaped with a portion thereof extending through said seal pocket open portion and another portion transverse thereto and positioned in said seal pocket enlarged outer peripheral portion; and said back-up rings each have a lip extending from around the outer perimeter thereof and toward the associated facing back-up ring and overlying a portion of said seal ring.

8. A seal assembly for a valve in a well packer, comprising:

a tubular seal carrier assembly mountable with a packer mandrel in an interior portion of a packer valve housing, said seal carrier assembly having a pair of annular seal elements mounted in a longitudinally spaced relation around the outer periphery thereof;

a pair of grooves formed around the outer periphery of said seal carrier with said seal elements mounted therein, said grooves are each formed by a recess formed transversely around the exterior of each end portion of said tubular seal carrier;

a back-up ring is mounted in opposed sides of each said recess;

said seal elements are each cross-sectionally generally T-shaped with a longitudinally shorter portion thereof extending outward to sealingly engage a valve seat, and the other longitudinally longer portion thereof is located in a radially inner portion of said groove and said seal elements each being positioned between the associated seal retainer ring and said spacer ring; and an inner annular seal between the inner perimeter of said seal carrier assembly and said mandrel for sealing between said seal carrier and said packer mandrel.

* * * * *